US009941575B2

(12) United States Patent
Cordier et al.

(10) Patent No.: US 9,941,575 B2
(45) Date of Patent: Apr. 10, 2018

(54) APPARATUS COMPRISING INDUCTIVE COUPLING COMMUNICATION MEANS

(71) Applicant: INSIDE SECURE, Meyreuil (FR)

(72) Inventors: Nicolas Cordier, Luynes (FR); Florian Pernisek, La Duranne (FR)

(73) Assignee: Inside Secure, Meyreuil (FR)

( * ) Notice: Subject to any disclaimer, the term of this patent is extended or adjusted under 35 U.S.C. 154(b) by 19 days.

(21) Appl. No.: 15/259,894

(22) Filed: Sep. 8, 2016

(65) Prior Publication Data

US 2016/0380339 A1     Dec. 29, 2016

Related U.S. Application Data

(63) Continuation of application No. 13/792,317, filed on Mar. 11, 2013, now Pat. No. 9,473,215, which is a (Continued)

(30) Foreign Application Priority Data

Oct. 19, 2010   (FR) ...................... 10 04096

(51) Int. Cl.
   *H01Q 1/50*    (2006.01)
   *H01Q 1/24*    (2006.01)
   (Continued)

(52) U.S. Cl.
   CPC .......... *H01Q 1/243* (2013.01); *G06F 1/1698* (2013.01); *G06K 7/0008* (2013.01);
   (Continued)

(58) Field of Classification Search
   CPC .......... H01Q 1/243; H01Q 7/005; H01Q 1/50; H01Q 1/24; H01Q 7/00
   (Continued)

(56) References Cited

U.S. PATENT DOCUMENTS

| 7,973,722 B1 | 7/2011 | Hill et al. |
| 2004/0256468 A1 | 12/2004 | Akiho et al. |

(Continued)

FOREIGN PATENT DOCUMENTS

| EP | 1445730 A1 | 8/2004 |
| GB | 2358991 A | 8/2001 |
| WO | 2012/052631 A2 | 4/2012 |

OTHER PUBLICATIONS

International Preliminary Report on Patentability received for PCT Patent Application No. PCT/FR2011/000562, dated Jul. 14, 2012, 9 pages.

(Continued)

*Primary Examiner* — Andrea Lindgren Baltzell
(74) *Attorney, Agent, or Firm* — Brake Hughes Bellermann LLP

(57) ABSTRACT

In a general aspect, a mobile communications apparatus can include a housing and inductive coupling communication circuitry configured to communicate in peer-to-peer mode with a like apparatus. The inductive coupling communication circuitry can include a communication controller and an inductive antenna. The inductive antenna can have at least one loop arranged in series between a first connection point and a second connection point and be proximate to a back wall of the housing. The inductive antenna can be, when the mobile communications apparatus is placed back-to-back in longitudinal and latitudinal alignment with a like mobile communications device, asymmetric with a like inductive antenna of the like mobile communications device, where a ratio of a sum of respective surface areas of mutually opposite surfaces of loops of a same rank of the inductive antenna divided by a sum of respective surface areas of the like inductive antenna is 0.8 or less.

15 Claims, 6 Drawing Sheets

Related U.S. Application Data continuation of application No. PCT/FR2011/000005, filed on Oct. 19, 2011.

(51) Int. Cl.
| | |
|---|---|
| *G06F 1/16* | (2006.01) |
| *G06K 7/00* | (2006.01) |
| *G06K 7/10* | (2006.01) |
| *H04B 5/00* | (2006.01) |
| *H01Q 7/00* | (2006.01) |
| *H04M 1/725* | (2006.01) |

(52) U.S. Cl.
CPC ..... *G06K 7/10237* (2013.01); *G06K 7/10336* (2013.01); *G06K 7/10386* (2013.01); *H01Q 1/50* (2013.01); *H01Q 7/00* (2013.01); *H01Q 7/005* (2013.01); *H04B 5/0031* (2013.01); *H04B 5/0081* (2013.01); *H04B 5/0093* (2013.01); *H04M 1/7253* (2013.01); *H04M 2250/04* (2013.01)

(58) Field of Classification Search
USPC .......................................................... 343/702
See application file for complete search history.

(56) References Cited

U.S. PATENT DOCUMENTS

| | | |
|---|---|---|
| 2010/0093412 A1 | 4/2010 | Serra et al. |
| 2013/0183897 A1 | 7/2013 | Cordier et al. |

OTHER PUBLICATIONS

International Search Report and Written Opinion received for PCT Patent Application No. PCT/FR2011/000562, dated Mar. 19, 2012, 20 pages. (10 pages Official Copy + 10 pages English Translation).

Non-Final Office Action received for U.S. Appl. No. 13/792,317, dated Sep. 18, 2015, 23 pages.

Response to Non-Final Office Action for U.S. Appl. No. 13/792,317, filed Feb. 18, 2016, 11 pages.

Notice of Allowance received for U.S. Appl. No. 13/792,317, dated Jul. 9, 2016, 10 pages.

APPARATUS COMPRISING INDUCTIVE COUPLING COMMUNICATION MEANS

CROSS-REFERENCE TO RELATED APPLICATIONS

This application is a continuation of U.S. application Ser. No. 13/792,317, filed Mar. 11, 2013, which is a continuation of, and claims priority to International Application No. PCT/FR2011/000562, filed Oct. 19, 2011. U.S. patent application Ser. No. 13/792,317 and International Patent Application No. PCT/FR2011/000562 both claim priority benefit to French Patent Application No. 10 04096, filed Oct. 19, 2010. The disclosures of U.S. patent application Ser. No. 13/792,317, International Patent Application No. PCT/FR2011/000562 and French Patent Application No. 10 04096 are all are incorporated herein by reference in their entireties.

BACKGROUND OF THE INVENTION

Embodiments of the present invention relate to an apparatus including inductive coupling communication circuitry configured to communicate in peer-to-peer mode with an identical apparatus, the communication circuitry including a communication controller and a planar antenna coil tuned to a working frequency, linked to the controller by way of two connection points and including N loops arranged in series between the two connection points.

Embodiments of the present invention also relate to a method of limiting a frequency detuning between first and second identical planar antenna coils turned to a working frequency when the antenna coils are arranged opposite each other at a distance less than 10 millimeters.

Embodiments of the present invention also relate to a method for establishing a communication by inductive coupling between two identical apparatuses, each including inductive coupling communication circuitry configured to communicate in peer-to-peer mode.

Embodiments of the present invention relate in a general manner to inductive coupling communication techniques also known as "NFC" (Near Field Communications).

A communication by inductive coupling generally uses a passive NFC device and an active NFC device, each equipped with an antenna coil tuned to a working frequency, for example 13.56 MHz. The active device emits a magnetic field oscillating at the working frequency, and sends data to the passive device by modulating the magnetic field. The passive device receives a voltage induced by the magnetic field, which it demodulates to extract the data contained therein, and sends data to the active device by charge modulation.

Apparatuses equipped with NFC devices, in particular NFC mobile telephones, generally have three operation modes: a reader mode, a card emulation mode, and a peer-to-peer mode. Embodiments of the present invention relate particularly to communications in peer-to-peer mode between two identical apparatuses.

During a communication in peer-to-peer mode, two apparatuses are arranged opposite each other, one being in active mode and emitting the magnetic field, the other being in passive mode and receiving the magnetic field in the form of an induced voltage in its antenna coil.

The conception of the antenna coil should generally take into consideration standards and constraints applicable to contactless cards, of those applicable to contactless card readers, as well as constraints specific to the peer-to-peer operating mode.

The standard ISO/IEC 7810 specifies a rectangular format "ID-1" for contactless cards used mainly in the transportation and payment sectors.

For the reading of contactless cards, the format of the reader and of its antenna is not standardized. However, the magnetic field produced by the reader's antenna coil must respect certain limits and its performances are verified during the certification of the reader. For applications in the transportation sector, the certification tests are based on the standard ISO/IEC 10373-6, whereas the standard "EMV contactless protocol 2.0" is generally applied in the payment sector.

The antenna coil of an NFC apparatus is generally planar and extends proximate to the internal face of a wall of the housing of the apparatus, for example its back wall. A communication in peer-to-peer mode thus requires placing the walls, proximate to the antenna coils, of the two devices mutually opposite each other.

In such a configuration, the antenna coils of the two apparatuses may be closely juxtaposed, their respective loops being mutually opposite. As the back walls of the housings are generally thin, they may be very close to one another, generally at a distance less than 10 millimeters.

Embodiments of the present invention include the observation that when a small distance separates two identical antenna coils placed opposite each other, a strong inductive coupling results, which detunes the frequency of each antenna coil and causes its Q factor to drop. This has the consequence of greatly reducing the amplitude of both the signal transmitted by the emitting antenna coil and the voltage received by the receiving antenna coil. Unexpectedly, these losses may be such that they prevent a communication between the two apparatuses, despite the fact that they are very close to one another.

As an example, the transmission losses were evaluated between two identical antenna coils opposite each other, each antenna including two imbricated planar loops extending along a rectangular outline of 31 millimeters (mm) in length and of 51 mm in width, the planes of the antenna coils being separated by a distance of 5 mm then by 1 mm. With a separation distance of 5 mm, the maximum transmission is obtained at a frequency of around 14 MHz instead of at 13.56 MHz, which reveals a slight detuning caused by the coupling, and the transmission losses are on the order of −6 dB, signifying that only 50% of the magnetic field is transmitted.

With a separation distance of 1 mm, the antenna coils are completely detuned with a low Q factor and the maximum transmission occurring at around 23 MHz. Thus, bringing the two antenna coils closer together leads in this case to a large shift of their tuning frequency, here from 13.56 MHz to 23 Mhz. Consequently, since the antenna coils are no longer tuned to the working frequency of 13.56 MHz, the transmission losses at 13.56 MHz greatly increase, and are on the order of −10 dB: only 32% of the magnetic field is transmitted.

It may therefore be desired to improve the quality of a communication by inductive coupling between two identical planar antenna coils turned to a working frequency, in particular when the antenna coils are arranged opposite each other at a distance less than 10 millimeters.

The patent application US 2004/0256468 discloses antenna coils integrated within an NFC telephone destined to read contactless cards and deprived of the peer-to-peer communication mode. The antenna coils shown in the FIGS. 6, 7A, and 8 of this document present a symmetric structure relative to a longitudinal Z-axis of the telephone (FIG. 11), and an asymmetrical structure relative to an X-axis perpendicular to the Z-axis. The antenna coils shown in the FIGS. 9 and 10 of this document include four loops and present an asymmetrical form relative to the longitudinal Z-axis, such that a contactless card can be read even when it is arranged at a point distant from the center of the antenna coil, for example above a keypad 71 of the telephone (FIG. 11).

SUMMARY OF THE INVENTION

Embodiments of the invention relate to an apparatus including inductive coupling communication circuitry configured to communicate in peer-to-peer mode with an identical apparatus, the communication circuitry including a communication controller and a planar antenna coil tuned to a working frequency, linked to the controller by way of two connection points and including N loops arranged in series between the two connection points. The antenna coil presents, relative to a longitudinal median or a transversal median axis of the antenna coil, an asymmetry corresponding to a coverage rate less than or equal to 0.6 if it includes 4 or more loops, less than or equal to 0.7 if it includes 3 loops, or less than or equal to 0.8 if it includes 1 or 2 loops. The coverage rate is equal to the sum of mutually opposite surfaces of loops of the same rank divided by the sum of surfaces of loops of the antenna coil, when the antenna coil is arranged in maximum mutual opposition with an identical antenna coil.

According to one embodiment, the number N of loops of the antenna coil arranged in series between the two connection points is at most equal to 3.

According to one embodiment, the antenna coil presents a coverage rate less than or equal to 0.7, irrespective of the number of loops it has.

According to one embodiment, the antenna coil includes at least one loop having a zero coverage rate.

According to one embodiment, the antenna coil includes at least one composite loop including two juxtaposed loops not having any common surface.

According to one embodiment, the antenna coil includes at least one supplementary tuning loop arranged between one of the two connection points and at least a third connection point, a supplementary tuning loop not intervening in the determination of the coverage rate of the antenna coil.

According to one embodiment, the antenna coil is arranged proximate one wall of the apparatus presenting a longitudinal median axis, and the antenna coil presents a longitudinal median axis that is the same as the longitudinal median axis of the wall.

According to one embodiment, the antenna coil is arranged proximate one wall of the apparatus, in a plane situated at less than 5 millimeters from an external face of the wall.

Embodiments of the invention also relate to a method of limiting frequency detuning between first and second identical planar antenna coils turned to a working frequency, when the antenna coils are arranged opposite each other at a distance less than 10 millimeters, each antenna coil including N loops arranged in series between two connection points of the antenna coil. The method includes conferring to each antenna coil, relative to a longitudinal median or a transversal median axis of the antenna coil, an asymmetry corresponding to a coverage rate less than or equal to 0.6 if it includes 4 or more loops, less than or equal to 0.7 if it includes 3 loops, or less than or equal to 0.8 if it includes 1 or 2 loops, wherein the coverage rate is equal to the sum of mutually opposite surfaces of loops of the same rank divided by the sum of surfaces of loops of the antenna coil, when the antenna coils are in maximum mutual opposition.

According to one embodiment, the method includes a step of choosing a number N of loops arranged in series between the two connection points that is at most equal to 3.

According to one embodiment, the method includes a step of conferring to each antenna coil a coverage rate less than or equal to 0.7, irrespective of the number of loops it has.

According to one embodiment, the method includes a step of providing in each antenna coil at least one loop having a zero coverage rate.

According to one embodiment, the method includes a step of providing in each antenna coil at least one composite loop including two juxtaposed loops not having any common surface.

According to one embodiment, the method includes a step of providing in each antenna coil at least one supplementary tuning loop arranged between one of the two connection points and at least a third connection point, and not taking into consideration the supplementary tuning loop in the determination of the coverage rate of the antenna coil.

Embodiments of the invention also relate to a method for establishing an inductive coupling communication between two identical apparatuses each including inductive coupling communication circuitry configured to communicate in peer-to-peer mode, the communication circuitry including a communication controller and a planar antenna coil tuned to a working frequency, linked to the controller by way of two connection points and including N loops arranged in series between the two connection points, including a step of placing walls of the two apparatuses mutually opposite such that the antenna coils are arranged opposite each other at a distance less than 10 millimeters. The method further includes conferring to each antenna coil, relative to a longitudinal median or a transversal median axis of the antenna coil, an asymmetry corresponding to a coverage rate less than or equal to 0.6 if it includes 4 or more loops, less than or equal to 0.7 if it includes 3 loops, or less than or equal to 0.8 if it includes 1 or 2 loops, the coverage rate being equal to the sum of mutually opposite surfaces of loops of the same rank divided by the sum of surfaces of loops of the antenna coil, when the antenna coils are in maximum mutual opposition.

According to one embodiment, the method includes a step of choosing a number N of loops arranged in series between the two connection points that is at most equal to 3.

According to one embodiment, the method includes a step of conferring to each antenna coil a coverage rate less than or equal to 0.7, irrespective of the number of loops it has.

According to one embodiment, the method includes a step of providing in each antenna coil at least one loop having a zero coverage rate.

According to one embodiment, the method includes a step of providing in each antenna coil at least one composite loop including two juxtaposed loops not having any common surface.

According to one embodiment, the method includes a step of providing in each antenna coil at least one supplementary tuning loop arranged between one of the two connection points and at least one third connection point, and not taking into consideration the supplementary tuning loop in the determination of the coverage rate of the antenna coil.

According to one embodiment, the method includes conferring to the antenna coil a form presenting a longitudinal median axis, and arranging the antenna coil proximate a wall of the apparatus presenting a longitudinal median axis situated at mid-distance between the lateral edges of the wall, such that the longitudinal median axis of the antenna coil is the same as the longitudinal median axis of the wall.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
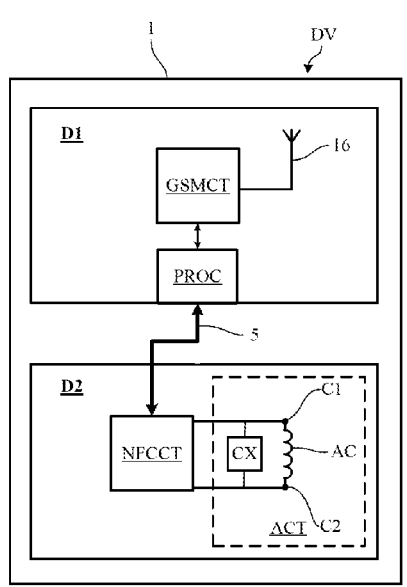
FIG. 1 schematically shows a portable apparatus including NFC communication circuitry, FIG. 2 schematically shows a cross-sectional view of the apparatus of FIG. 1 placed back to back with an identical apparatus, FIG. 3 schematically shows a top view of an embodiment of an antenna coil according to the invention.

FIG. 1 shows a portable apparatus DV, such as a mobile telephone. The apparatus DV includes, arranged in a housing 1, an application device D1 and a communication device D2. The devices D1, D2 are linked by a communication interface 5, for example a data bus.

The application device D1 includes for example a radio communication circuit GSMCT and a processor PROC. The circuit GSMCT is linked to a UHF antenna 16 and is configured to ensure the establishment of a data link with a telecommunication network. The processor PROC is for example a baseband processor.

The device D2 is an NFC communication device including an NFC controller, designated NFCCT, equipped with an antenna circuit ACT. The antenna circuit ACT includes an antenna coil AC and components CX (such as capacitors) allowing the antenna coil AC to be tuned to a working frequency, for example 13.56 MHz. The controller NFCCT is configured to ensure the establishment of communications by inductive coupling between the apparatus DV and an external NFC component (not shown), by way of the antenna coil AC. The external component may be a contactless card when the device D2 is operating in reader mode, a contactless card reader when the device D2 is operating in card emulation mode, or an apparatus DV' identical to the apparatus DV when the device DV is operating in peer-to-peer mode. The processor PROC of the application device D1 may be configured as a host processor of the controller NFCCT, to manage applications in reader mode or in peer-to-peer mode.

Figure 2:
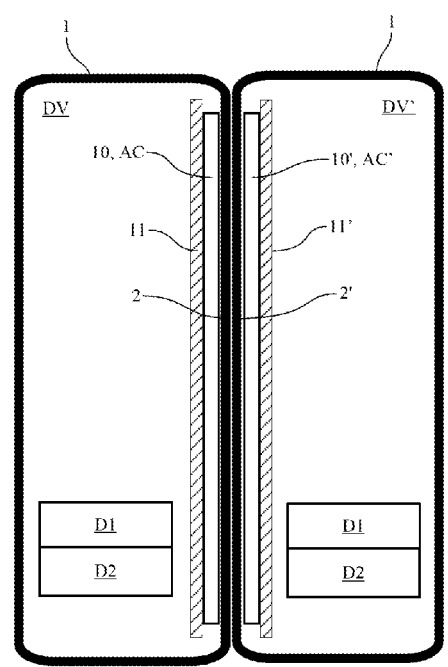

FIG. 2 schematically shows a cross-sectional view of the apparatus DV. The antenna coil AC is also shown in cross-section and includes a planar conductor 10 arranged on an isolating support 11 and proximate to a wall 2 of the housing 1, for example its back wall.

FIG. 2 also shows another apparatus DV' identical to the apparatus DV. The apparatus DV' includes an antenna coil AC' identical to the antenna coil AC and including a conductor 10' on an isolating support 11' and arranged proximate to a wall 2' of the housing 1' of the device DV'.

The configuration shown is that of a peer-to-peer communication between the two devices DV, DV'. The wall 2' of the apparatus DV' is placed against the wall 2 of the apparatus DV, the antenna coils AC, AC' being mutually opposite and very close to each other, generally at a distance less than 10 millimeters. The antenna coils are generally stuck to the wall 2 by way of an adhesive strip. A double-sided adhesive has a thickness on the order of 30 micrometers, greatly less than a millimeter. Moreover, a wall of a mobile telephone may be locally thinned and have a thickness less than a millimeter. Thus, the minimum distance between the two antenna coils may be on the order of a millimeter.

Embodiments of the invention relate to structures of the antenna coil AC decreasing the frequency detuning of each AC, AC' during a peer-to-peer communication mode corresponding to the configuration of FIG. 2. It is desired to limit this frequency detuning to a range of plus or minus 20% when the antenna coils AC, AC' are arranged in maximum mutual opposition, which in practice corresponds to the worst case scenario in terms of frequency detuning.

The present invention includes the following observations:

the frequency detuning increases as the number of loops of the antenna coils AC, AC' increases, the provision of an asymmetry in the structure of the antenna coils AC, AC' decreases the frequency detuning, the asymmetry of antenna coils AC, AC' should be greater as the number of loops increases, in order to compensate for the impact of the number of loops on the frequency detuning.

In order to quantify the necessary asymmetry and to determine the conception rules applicable to antenna coils having a different number of loops, the present invention provides a parameter termed "coverage rate". This coverage rate is determined when the antenna coil is arranged with maximum mutual opposition with itself (that is, with another identical antenna coil), and is equal to the sum $\Sigma FSW_i$ of the mutually opposite surfaces $FSW_i$ of loops $SW_i$ of the same rank of the antenna coil, divided by the sum $\Sigma SW_i$ of the surfaces $SW_i$ of loops $W_i$ of the antenna coil.

The arrangement termed "maximum mutual opposition" is an arrangement in which the sum $\Sigma FSW_i$ of mutually opposite surfaces $FSW_i$ of loops $SW_i$ of the same rank of the antenna coil is at a maximum. This arrangement is generally obtained when the longitudinal median axis and the transversal median axis of two identical antenna coils are aligned (i.e. superimposed).

The present invention also includes the discovery that in order to limit the frequency detuning of the antenna coil AC to an acceptable range of values, for example on the order of plus or minus 20%, when it is arranged in maximum mutual opposition with an identical antenna coil AC', the antenna coil AC should have, relative to its longitudinal median or transversal median axis, an asymmetry corresponding to a coverage rate less than or equal to 0.6 if it includes 4 or more loops, less than or equal to 0.7 if it includes 3 loops, or less than or equal to 0.8 if it includes 1 or 2 loops.

It will clearly appear by the following that the axis along which an antenna coil AC presents an asymmetry must be the axis along which it is placed mutually opposite the antenna coil AC' during a peer-to-peer application. This axis is generally the longitudinal median axis of the antenna coil if it is parallel to or the same as the longitudinal median axis of the housing 1, because the apparatuses DV, DV' are generally arranged in the same direction when they are placed in peer-to-peer mode. If the users are requested to orient the apparatuses in inverted directions during a peer-to-peer communication (that is, top to bottom), the asymmetry will thus be provided relative to an axis of the antenna coil that is transversal to the longitudinal median axis of the wall 2 of the housing. In order to simplify the terminology, in the following, the term "longitudinal median axis" of an antenna coil designates the axis of the antenna coil that is parallel to or the same as the longitudinal median axis of the wall of the housing including the antenna coil, including the hypothesis where the geometric longitudinal median axis of the antenna coil is transversal to this axis (the case of an antenna coil that does not extend over the entire length of the wall and presents a rectangular form transversal thereto).

Embodiments AC1, AC2, AC3, AC4, AC5, AC6 of the antenna coil AC will now be described.

Figure 3:
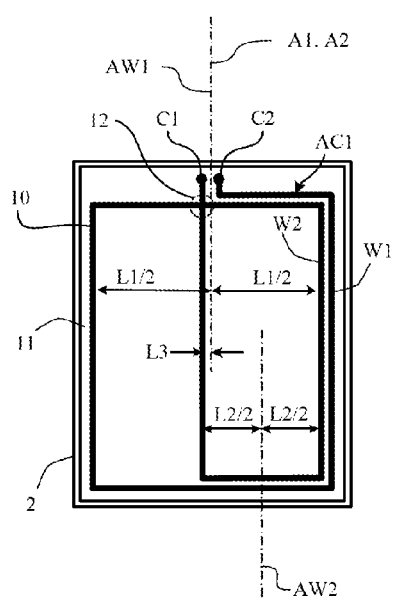

The antenna coil AC1 shown in FIG. 3 includes a first loop W1 of an essentially rectangular form (the figure shows sharp angles that could be rounded in practice) and a second loop W2 also of rectangular form, extending inside the loop W1. The loops W1, W2 are formed by the conductor 10 on the isolating support 11. The extremities of the conductor 10 are connected to connection terminals or contacts C1, C2 linked to the controller NFCCT (Cf. FIG. 1). The conductor 10 presents here a crossing or overlapping zone 12 where it passes above itself by way of an isolating layer (not shown). In other embodiments, the overlapping zone could be provided by another conductor, buried in the isolating support 11.

In order to maximize the surface of the antenna coil AC and to increase the communication distance of the device DV in reader mode or in card emulation mode, the loop W1 here occupies the majority of the surface of the wall 2. The loop W1 thus presents a longitudinal median axis AW1 that is the same as a longitudinal median axis A2 of the wall 2 (the axis A2 extending at mid-distance between the edges of the wall 2). The axis AW1 also forms the global longitudinal median axis A1 of the antenna coil AC1, that is to say an axis situated at mid-distance between the extreme lateral edges of the antenna coil. In FIG. 3, "L1" designates the width of the loop W1. The axes AW1, A1 are thus at a distance equal to L1/2 of the two edges of the loop W1.

The loop W2 has a width L2 less than L1 and presents, at mid-distance from its edges (L2/2), a longitudinal median axis AW2 that is shifted relative to the longitudinal median axis A1, AW1. More precisely, the left edge of the loop W2 extends here at a distance L3 of the longitudinal median axis A1, AW1 representing 5% of its width L2.

Figure 4:
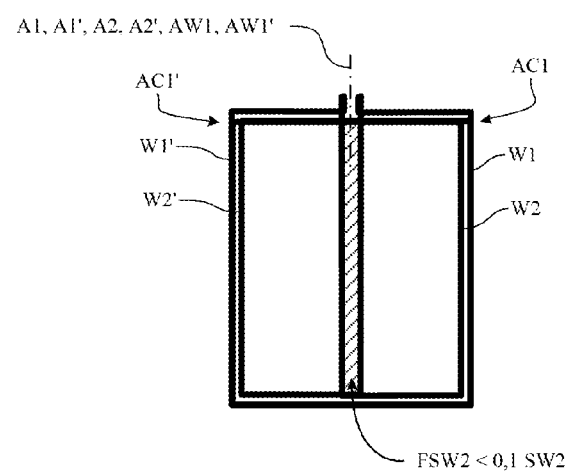
FIG. 4 shows two antenna coils identical to that of FIG. 3, arranged in maximum mutual opposition, FIG. 5 schematically shows a top view of another embodiment of an antenna coil according to the invention.

When the antenna coil AC1 is arranged in maximum mutual opposition with an identical antenna coil AC1', as shown in FIG. 4, the mutually opposite surface FSW2 of the loop W2 of the antenna coil AC1 and of a loop W2' of the same rank of the antenna coil AC1' is equal to 1/10 of the surface SW2 of the loop W2. In this arrangement, the mutually opposite surface FSW1 of the loop W1 of the antenna coil AC1 and of a loop W1' of the same rank of the antenna coil AC1' is equal to the surface SW1 of the loop W1 because the loop W1 is perfectly symmetrical.

The coverage rate may thus be calculated by considering that the surface SW1 of the loop W1 is equal to 1 (the reference surface being set to one) and by considering, by way of example, that the surface SW2 of the loop W2 is equal to half that of the loop W1. It follows that:
  the surface SW1 of the loop W1=1
  the surface SW2 of the loop W2=0.5
  the surface FSW1 of the loop W1 opposite the loop W1'=1
  the surface FSW2 of the loop W2 opposite the loop W2'= 0.1*SW2=0.1*0.5=0.05
  ΣFSWi=1+0.05=1.05
  ΣSWi=1.5
  The coverage rate is thus equal to:
  ΣFSWi/ΣSWi=1.05/1.5=0.7

In one embodiment, the distance L3 is equal to 0. In this case, the area covered by the loop W2 does not include a portion to the left of the longitudinal median axis A1 of the antenna coil and the loop presents an individual coverage rate equal to zero (complete asymmetry). The antenna coil AC1 thus presents a coverage rate equal to 1/1.5, thus 0.66. In another embodiment, the loop W2 presents an individual coverage rate equal to 0 and a surface equal to 0.45 times the surface of the loop W1. In this case, the antenna coil AC1 presents a coverage rate equal to 1/1.45, thus 0.69.

Figure 5:
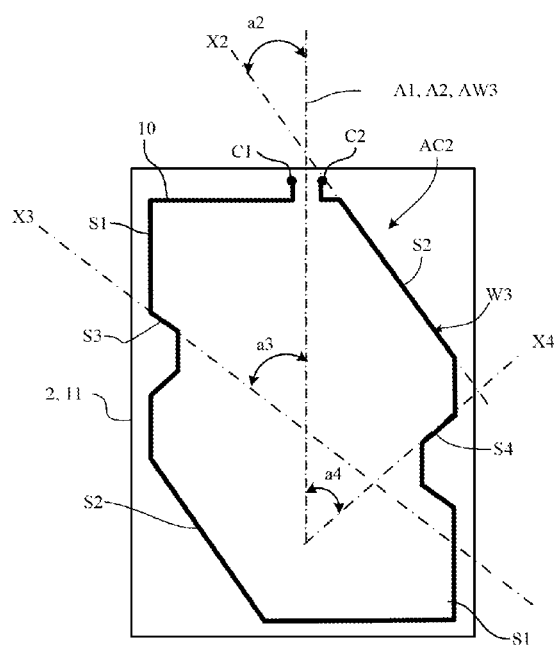

FIG. 5 shows an antenna coil AC2 including a single loop W3, of asymmetric form. The loop W3 presents a longitudinal median axis AW3 that forms the global longitudinal median axis A1 of the coil, and is the same as the longitudinal median axis A2 of the wall 2. The loop W3 presents straight portions S1 of the conductor 10 that are parallel to the axis AW3 and straight portions S2, S3, S4 of the conductor 10 that follow directions X2, X3, X4 having angles a2, a3, a4 included between 10° and 80° relative to the longitudinal median axis AW3.

Figure 6:
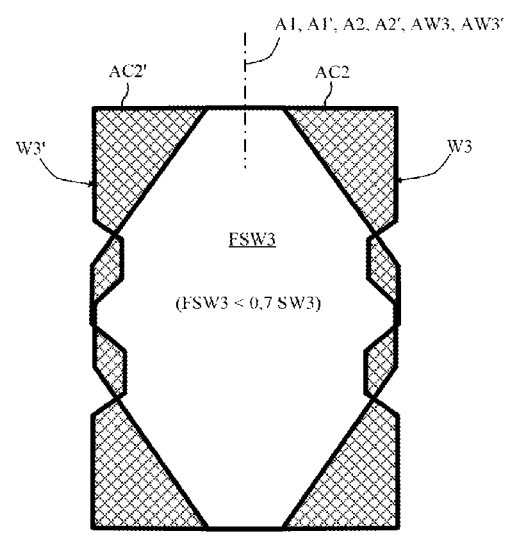
FIG. 6 shows two antenna coils identical to that of FIG. 5, arranged in maximum mutual opposition, FIGS. 7 to 10 schematically show top views of other embodiments of antenna coils according to the invention, FIG. 11 schematically shows a top view of a variation of the antenna coil of FIG. 3.

As shown in FIG. 6, the form of the loop is here determined so that it presents a coverage rate less than 0.7:
  the surface SW3 of the loop W3=1
  (the surface being set to one),
  the surface FSW3 of the loop W3 opposite a loop W3' of an antenna coil AC2' identical to AC2=0.7,
  ΣFSWi=FSW3=0.7
  ΣSWi=SW3=1
  ΣFSWi/ΣSWi=0.7/1=0.7

Figure 7:
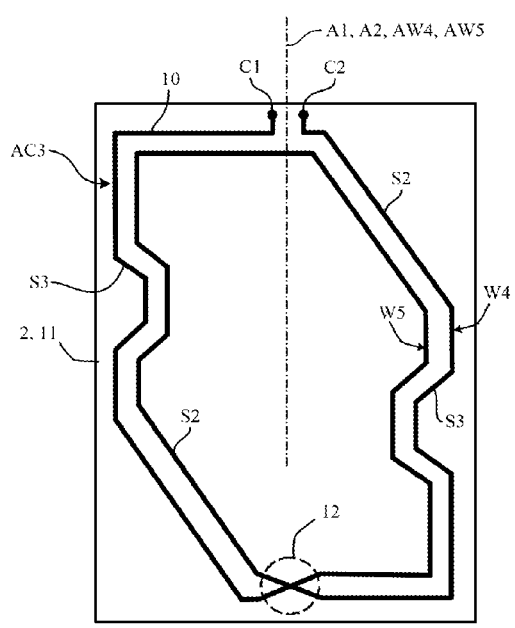

FIG. 7 shows an antenna coil AC3 including two loops W4, W5, the loop W5 extending inside the loop W4. The conductor 10 presents a crossing point 12 situated at the lower part of the loops, opposite the contacts C1, C2. The loops W4, W5 have essentially the same form as the loop W3 previously described, and each presents an individual coverage rate less than 0.7. It follows that the coverage rate of the antenna coil AC3 considered in its entirety is also less than 0.7.

Figure 8:
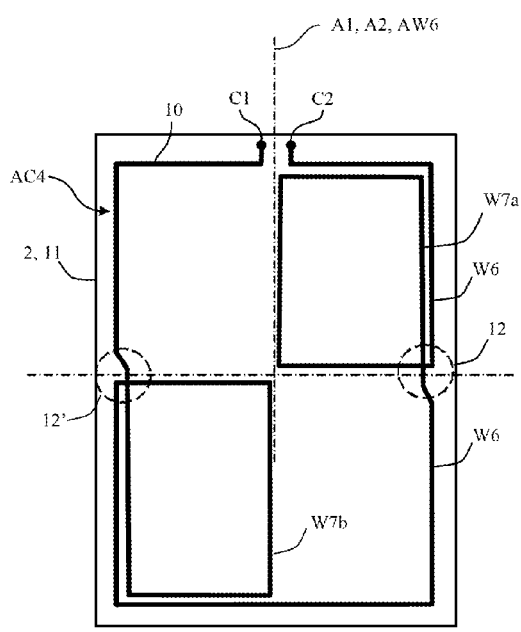

FIG. 8 shows an antenna coil AC4 including a large loop W6 of essentially rectangular form, inside of which a composite loop W7 including two loops W7a, W7b juxtaposed and separate (i.e. not having a common surface) that are also of essentially rectangular form. The antenna coil AC4 presents a longitudinal median axis A1 corresponding to the longitudinal median axis AW6 of the loop W6 and coinciding here with the longitudinal median axis of the wall 2 of the apparatus. The conductor 10 forming the antenna coil presents two crossing zones 12, 12' near the loops W7a, W7b.

The loops W7a, W7b are juxtaposed such that the resulting composite loop W7 presents an individual coverage rate equal to 0. More particularly, the loop W7a presents a surface less than or equal to a forth of the surface of the loop W6 and is arranged in the upper right quadrant of the loop W6. The loop W7b presents a surface less than or equal to a forth of the surface of the loop W6 and is arranged in the lower left quadrant of the loop W6.

Thus, when the antenna coil AC4 is arranged in maximum mutual opposition with an identical antenna coil AC4', the loop W7a is not opposite corresponding loops W7a', W7b' of the antenna coil AC4' and the loop W7b is not opposite corresponding loops W7a', W7b' of the antenna coil AC4', the composite loop W7 thus presenting a coverage rate equal to 0. If the surface of each loop W7a, W7b is equal to ¼ of the surface of the loop W6, the coverage rate of the antenna coil AC4 is equal to (1+0+0)/(1+0.25+0.25), thus 1/1.5=0.66.

Figure 9:
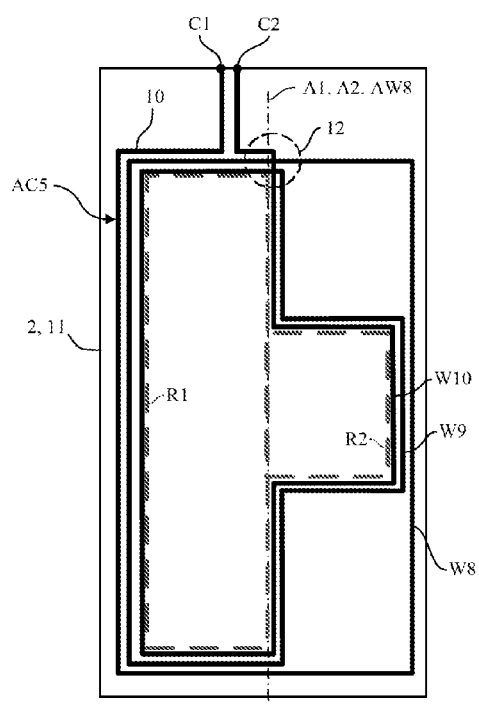

FIG. 9 shows an antenna coil AC5 including an essentially rectangular large loop W8 and two birectangular loops, the loop W9 extending inside the loop W8 and the loop W10 inside the loop W9. The loop W8 presents a longitudinal median axis AW8 forming the longitudinal median axis A1 of the antenna coil AC5, which is here the same as the longitudinal median axis A2 of the wall 2 of the housing. The loops W9, W10 each follow a path corresponding to the perimeter of a form including two rectangles R1, R2 arranged next to each other and on opposite sides of the longitudinal median axis A1. The rectangle R2 presents the same width as the rectangle R1 and a length equal to a quarter of the length of the rectangle R1. Because of this, the individual coverage rate of each loop W9, W10 is equal to twice the surface of R2 divided by the surface of R1 plus the surface of R2, that is 2*1*0.25/(1+0.25), considering that the surface of the rectangle R1 is equal to 1, thus a coverage rate equal to 0.4.

By disregarding the surface of the conductor 10 forming the loops and the distance between the loops W8 to W10, and by considering that the loop W8 presents a surface of 1, that the rectangle R1 presents a surface of 0.5, and that the rectangle R2 presents a surface of 0.25, the coverage rate of the antenna coil AC5 is calculated in the following manner:

the surface SW8 of the loop W8=1
(the surface being set to one),
the surface SW9 of the loop W9=0.5+0.25*0.5=0.625
the surface SW10 of the loop W10=0.5+0.25*0.5=0.625
the surface FSW8 of the loop W8 opposite a loop W8' of an antenna coil AC5' identical to AC5=1
the surface FSW9 of the loop W9 opposite a loop W9' of the antenna coil AC5'=2*0.5*0.25=0.25
the surface FSW10 of the loop W10 opposite a loop W10 of the antenna coil AC5'=2*0.5*0.25=0.25
ΣFSWi=1+0.25+0.25=1.5
ΣSWi=1+0.625+0.625=2.25
Thus:
ΣFSWi/ΣSWi=1.5/2.25=0.66

Figure 10:
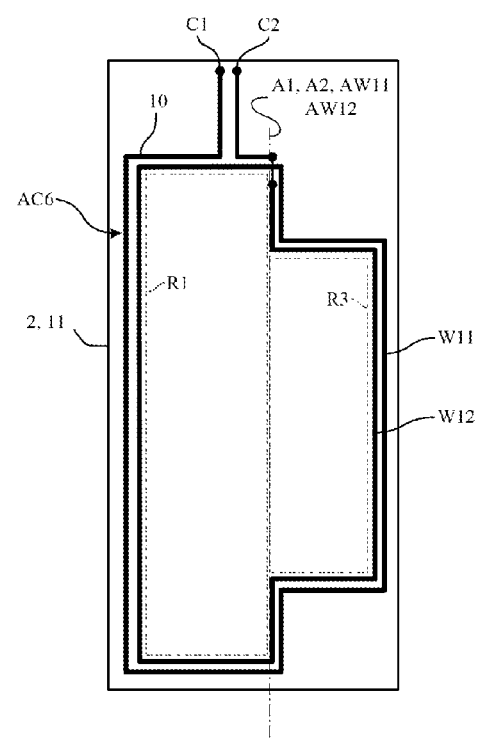

FIG. 10 shows an antenna coil AC6 including two birectangular loops W11, W12, each following a path corresponding to the perimeter of a form including two rectangles R1, R3 arranged next to each other. The loops W11, W12 present a longitudinal median axis AW11, AW12 that forms the longitudinal median axis A1 of the antenna coil AC6 and is here the same as the longitudinal median axis A2 of the wall 2 of the housing. The rectangles R1 and R3 have the same width and are arranged on opposite sides of the axis A1. It may be supposed for example that the rectangle R3 has a length equal to half the length of the rectangle R1 (the diagram of FIG. 10 merely being approximate). In this case, by considering that the surface of the rectangle R1 is equal to 1 and the surface of the rectangle R3 is equal to 0.5, the individual coverage rate of each loop W11, W12 is equal to twice the surface of R3 divided by the sum of the surface of R3 and the surface of R1, that is (2*0.5)/1.5, thus 0.66. The loops having the same form, and by disregarding the surface of the conductor 10 and the inter-loop distance, the coverage rate of the antenna coil AC6 is essentially equal to the individual coverage rate of each of the loops, thus 0.66.

Embodiments of the present invention also apply to "multi tap" antenna coils, of the type disclosed in the international application WO 2010/066799. This type of antenna coil includes at least one supplementary tuning loop arranged between one of the two connection terminals C1, C2 of the antenna coil to the controller NFCCT, and at least a third connection terminal C3. In this case, the supplementary tuning loop does not intervene in the determination of the coverage rate of the antenna coil but is taken into consideration for the determination of the arrangement in maximum mutual opposition, from which the coverage rate is calculated.

Figure 11:
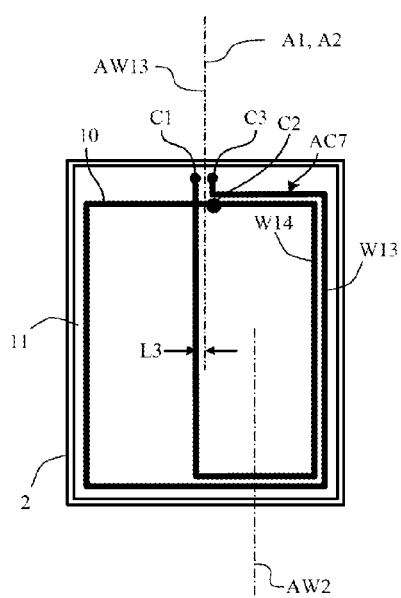

An example of a multi-tap antenna coil AC7 is shown in FIG. 11. In this example, the antenna coil AC7 is of the same form as that of the antenna coil AC1 of FIG. 3 and includes a large loop W13 of the same form as that of the loop W1 of FIG. 3, and a small loop W14 of the same form as that of the loop W2 of FIG. 3.

The antenna coil AC7 differs from the antenna coil AC1 in that the contact C2 is arranged at the end of the loop W14, and in that a contact C3 is arranged at the end of the loop W13. Thus, the loop W14 extends between the contacts C1 and C2, and the loop W13 extends between the contacts C2 and C3.

Figure 12:
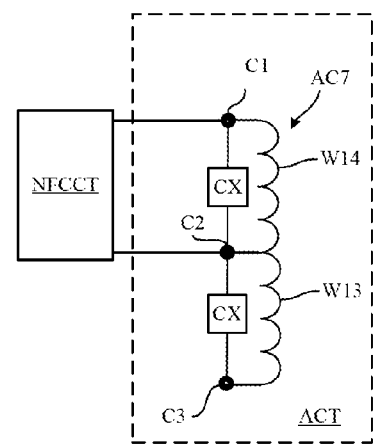
FIG. 12 is an electrical diagram of an antenna circuit including the antenna coil of FIG. 11.

An electrical diagram shown in FIG. 12 shows that the loop W14 is linked to the controller NFCCT by way of the contacts C1, C2, whereas the loop W13 is used as a supplementary tuning loop. Thus, tuning components CX may be arranged between the contacts C1 and C2 and/or between the contacts C2 and C3, and/or between the contacts C1 and C3.

In such an embodiment, the coverage rate of the antenna coil is determined relative to the loop W14 only, with respect to an arrangement of the antenna coil in maximum mutual opposition with a similar antenna coil AC7' (Cf. for example FIG. 4). The arrangement in maximum mutual opposition is however determined by taking into consideration all the loops W13, W14 of the antenna coil. In conformance with the definition previously provided, the arrangement in maximum mutual opposition is thus an arrangement wherein the sum ΣFSWi of mutually opposite surfaces FSWi of loops SWi of the same rank of the antenna coil is at a maximum. Once the maximum mutual opposition has been determined, the loop W13 is not taken into consideration for the calculation of the coverage rate of the antenna coil AC7, which is thus equal here to the individual coverage rate of the loop W14. The individual coverage rate of the loop W14 is equal to 0.1 if the left edge of the loop W14 extends to the left of the longitudinal median axis A1 of the antenna coil, at a distance L3 that is equal to 5% of the width of the loop W14.

It will clearly appear to the skilled person that the present invention is susceptible to various alternative embodiments and applications. Embodiments of the invention apply, in a general manner, to any application in which two tuned antenna coils must be arranged mutually opposite and at a small distance from each other, when this distance is susceptible of detuning the antenna coils and of reducing the transmission of the electrical signal between the two antenna coils.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A mobile communications apparatus comprising:
a housing including a back wall; and
inductive coupling communication circuitry configured to communicate in peer-to-peer mode with a like apparatus, the inductive coupling communication circuitry including:
a communication controller; and
an inductive antenna tuned to a working frequency, the inductive antenna having at least one loop arranged in series between a first connection point and a second connection point, the inductive antenna being proximate to the back wall of the housing,
the inductive antenna being, when the mobile communications apparatus is placed back-to-back in longitudinal and latitudinal alignment with a like mobile communications apparatus, asymmetric with a like inductive antenna of the like mobile communications apparatus such that a ratio of a sum of respective surface areas of mutually opposite surfaces of loops of a same rank of the inductive antenna divided by a sum of respective surface areas of the like inductive antenna is less than or equal to 0.8, the like inductive antenna of the like mobile communications apparatus being of a same arrangement as the inductive antenna.

2. The mobile communications apparatus of claim 1, wherein the inductive antenna includes one loop.

3. The mobile communications apparatus of claim 1, wherein the inductive antenna includes less than or equal to three loops and the ratio is less than or equal to 0.7.

4. The mobile communications apparatus of claim 1, wherein the inductive antenna includes four loops or more loops and the ratio is less than or equal to 0.6.

5. The mobile communications apparatus of claim 1, wherein the inductive antenna includes at least one composite loop including two juxtaposed loops without a common surface.

6. The mobile communications apparatus of claim 1, wherein the inductive antenna includes at least one supplementary tuning loop arranged between one of the first connection point and the second connection points and at least a third connection point, a surface area of the at least one supplementary tuning loop not being included in a determination of the ratio.

7. The mobile communications apparatus of claim 1, wherein a plane defined by the inductive antenna is parallel with a plane defined by the back wall of the housing.

8. The mobile communications apparatus of claim 1, wherein the inductive antenna is arranged proximate an internal face of the back wall of the housing, the inductive antenna being situated in a plane that is less than 5 millimeters from an external surface of the back wall of the housing.

9. A method of limiting frequency detuning between an inductive antenna included in a mobile communications apparatus and a like inductive antenna included in a like mobile communications apparatus, the like inductive antenna having a same arrangement as the inductive antenna and the like mobile communications apparatus having a same arrangement as the mobile communications apparatus, the inductive antenna and the like inductive antenna being tuned to a same working frequency, the method comprising:
placing the mobile communications apparatus back-to-back in longitudinal and latitudinal alignment with the like mobile communications apparatus at a distance of less than 10 millimeters, the inductive antenna and the like inductive antenna each including at least one loop connected in series between a respective first connection point and a respective second connection point; and
communicating data between the inductive antenna and the like inductive antenna using a magnetic field that is asymmetrically emitted as a result of a ratio of a sum of respective surface areas of mutually opposite surfaces of loops of a same rank of the inductive antenna divided by a sum of respective surface areas of the like inductive antenna being less than or equal to 0.8.

10. The method of claim 9, wherein the inductive antenna and the like inductive antenna each include one loop.

11. The method of claim 9, wherein:
the inductive antenna and the like inductive antenna each include less than or equal to 3 loops; and
the ratio is less than or equal to 0.7.

12. The method of claim 9, wherein:
the inductive antenna and the like inductive antenna each include greater than or equal to 4 loops; and
the ratio is less than or equal to 0.6.

13. The method of claim 9, wherein the inductive antenna includes at least one loop with no magnetic field emitting surfaces that are mutually opposite magnetic receiving surfaces of the like inductive antenna with the mobile communications apparatus placed back-to-back in longitudinal and latitudinal alignment with the like mobile communications apparatus.

14. The method of claim 9, wherein the inductive antenna and the like inductive antenna include at least one composite loop including two juxtaposed loops without a common surface.

15. The method according of claim 9, wherein the inductive antenna and the like inductive antenna each include at least one supplementary tuning loop arranged between one of the first connection points and the second connection points, and at least respective third connection points, surface areas of the at least one supplementary tuning loops not being included in a determination of the ratio.

* * * * *